(12) United States Patent
Yamaguchi

(10) Patent No.: US 9,335,741 B2
(45) Date of Patent: May 10, 2016

(54) ELECTRONIC DEVICE

(71) Applicant: Seiko Epson Corporation, Shinjuku-ku (JP)

(72) Inventor: Eiichiro Yamaguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/472,810

(22) Filed: Aug. 29, 2014

(65) Prior Publication Data

US 2015/0063076 A1 Mar. 5, 2015

(30) Foreign Application Priority Data

Sep. 2, 2013 (JP) ................... 2013-181106

(51) Int. Cl.
*G04G 9/06* (2006.01)
*G04F 10/00* (2006.01)
*G01C 22/00* (2006.01)
*G04G 9/00* (2006.01)
*G04G 21/04* (2013.01)
*G04R 20/02* (2013.01)

(52) U.S. Cl.
CPC .............. *G04F 10/00* (2013.01); *G01C 22/006* (2013.01); *G04G 9/0064* (2013.01); *G04G 21/04* (2013.01); *G04R 20/02* (2013.01)

(58) Field of Classification Search
CPC ......... G04F 1/00; G04F 10/00; G04B 47/061; G04C 22/006; G04G 9/0064; G04G 21/04; G04R 20/02

USPC .................................................... 368/89, 327
See application file for complete search history.

(56) References Cited

U.S. PATENT DOCUMENTS

| | | | | |
|---|---|---|---|---|
| 4,758,959 A | * | 7/1988 | Thoone et al. ................. | 701/472 |
| 5,724,316 A | * | 3/1998 | Brunts ............................ | 368/10 |
| 7,372,780 B1 | * | 5/2008 | Braunberger ................. | 368/114 |
| 7,593,290 B2 | * | 9/2009 | Stange et al. ................... | 368/10 |
| 2003/0016590 A1 | * | 1/2003 | Brewer et al. .................. | 368/82 |
| 2003/0151985 A1 | * | 8/2003 | Braunberger ................. | 368/327 |
| 2004/0013048 A1 | * | 1/2004 | Adamy ......................... | 368/327 |
| 2007/0140068 A1 | * | 6/2007 | Teffenhart et al. ............ | 368/327 |
| 2008/0123473 A1 | * | 5/2008 | Ozawa et al. .................. | 368/18 |

FOREIGN PATENT DOCUMENTS

JP 07-055962 A 3/1995

* cited by examiner

*Primary Examiner* — Sean Kayes
(74) *Attorney, Agent, or Firm* — Kilpatrick Townsend & Stockton LLP

(57) ABSTRACT

A running watch includes: a time measurement portion which measures a lapse of time; an operation button which indicates a measurement with respect to the time measurement portion; a display portion which displays a measurement result in the time measurement portion on a display screen; and a display color switching portion which switches a display color of the display screen corresponding to a measurement state of the time measurement portion.

8 Claims, 4 Drawing Sheets

ELECTRONIC DEVICE

BACKGROUND

1. Technical Field

The present invention relates to an electronic device.

2. Related Art

As an electronic device has higher integration levels and more functions, various measurement modes are implemented in a stopwatch which measures time. For example, as JP-A-7-55962 shows, as a user operates an operation button, it is possible to confirm a lap time value even during measurement while traveling, and to record the measured timing information in a memory.

In recent years, as a global positioning system (GPS) represents, a technology which takes a measurement of a position of a moving object by using a satellite positioning system by a satellite and measures movement information of the moving object based on a time change of the measured position, is known. There is provided a watch which implements the measuring function and the timing function, and has many functions that display various types of information while traveling based on the movement information and the timing information.

However, it is required that various types of information which are displayed in a display region of the watch be displayed in a large size so that the user is able to visually confirm it even while traveling. As a result, status information which shows a measurement state is displayed in a small size in an empty region of the display region. Accordingly, the user cannot easily determine whether or not the measurement is in progress, and it is easy for the user to cause a measurement error.

SUMMARY

An advantage of some aspects of the invention is to easily confirm a measurement state visually.

The invention can be implemented as the following forms or application examples.

Application Example 1

This application Example is directed to an electronic device including: a measurement portion which measures a lapse of time; an indication portion which indicates a measurement with respect to the measurement portion; a display portion which displays a measurement result measured by the measurement portion on a display screen; and a display control portion which switches a display color of the display screen corresponding to a measurement state of the measurement portion.

According to this configuration, the measurement portion measures based on an indication of the indication portion, and the display color of the display screen which displays the measurement result on the display portion is switched according to the measurement state of the measurement portion. For this reason, by visually confirming the display color of the display screen, it is possible to easily recognize the measurement state.

Application Example 2

In the electronic device according to the application example described above, it is preferable that the indication portion indicates an initiation and a stop of the measurement, that the measurement portion transits to a measurement state or a non-measurement state according to the indication of the indication portion, and that the display control portion switches the display color to a first color when the measurement portion is in the measurement state, and switch the display color to a second color when the measurement portion is in the non-measurement state.

According to this configuration, since the display color of the display screen is switched to the first color when the measurement portion is in the measurement state, and the display color of the display screen is switched to the second color when the measurement portion is in the non-measurement state, it is possible to immediately recognize the measurement state of the measurement portion by visually confirming whether the display color of the display screen is the first color or the second color.

Application Example 3

In the electronic device according to the application example described above, it is preferable that the display control portion switches the display color of at least a part of an area of the display screen corresponding to the state of the measurement portion.

Application Example 4

In the electronic device according to the application example described above, it is preferable that the display screen includes a character area and a background area, and the display control portion switches at least one display color of the character area and the background area.

Application Example 5

In the electronic device according to the application example described above, it is preferable the display screen is displayed in white and in black, and the display control portion switches the white color and the black color to each other.

Application Example 6

In the electronic device according to the application example described above, it is preferable that the indication portion indicates the stop of the measurement when the measurement portion is in the measurement state and a predetermined condition is established.

According to this configuration, it is possible that the measurement portion in the measurement state transits to in the non-measurement state when the predetermined condition is established.

Application Example 7

In the electronic device according to the application example described above, it is preferable that a position calculation portion which calculates the positional information based on a signal from a positioning satellite is provided, and the measurement portion measures the movement information based on the lapse of time and the positional information.

According to this configuration, it is possible to measure the movement information of the device itself, based on the positional information which is based on the signal from the positioning satellite, and the lapse of time.

Application Example 8

In the electronic device according to the application example described above, it is preferable that the movement information is a movement distance which considers a position where the measurement is initiated as a starting point, and the display portion displays the movement distance.

Application Example 9

In the electronic device according to the application example described above, it is preferable that an acceleration detection portion which detects acceleration and calculates a movement amount based on the detected acceleration is provided, and that the measurement portion calculates the movement distance based on the movement amount calculated by the acceleration detection portion when the position calculation portion cannot calculate the positional information.

According to this configuration, it is possible to calculate the movement distance based on the movement amount calculated by the acceleration detection portion even when the position calculation portion cannot calculate the positional information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Embodiment

Hereinafter, an appropriate example of an electronic device according to the invention will be described. Here, an outline of a running watch 10 which is an electronic device that receives and uses a signal for positioning or the like by a radio wave from a positional information satellite or the like that constitutes a communication system, will be described as an example. In the embodiment, a GPS system is assumed as the communication system. However, the embodiment is not limited thereto, and various satellite positioning systems can be assumed.

Figure 1:
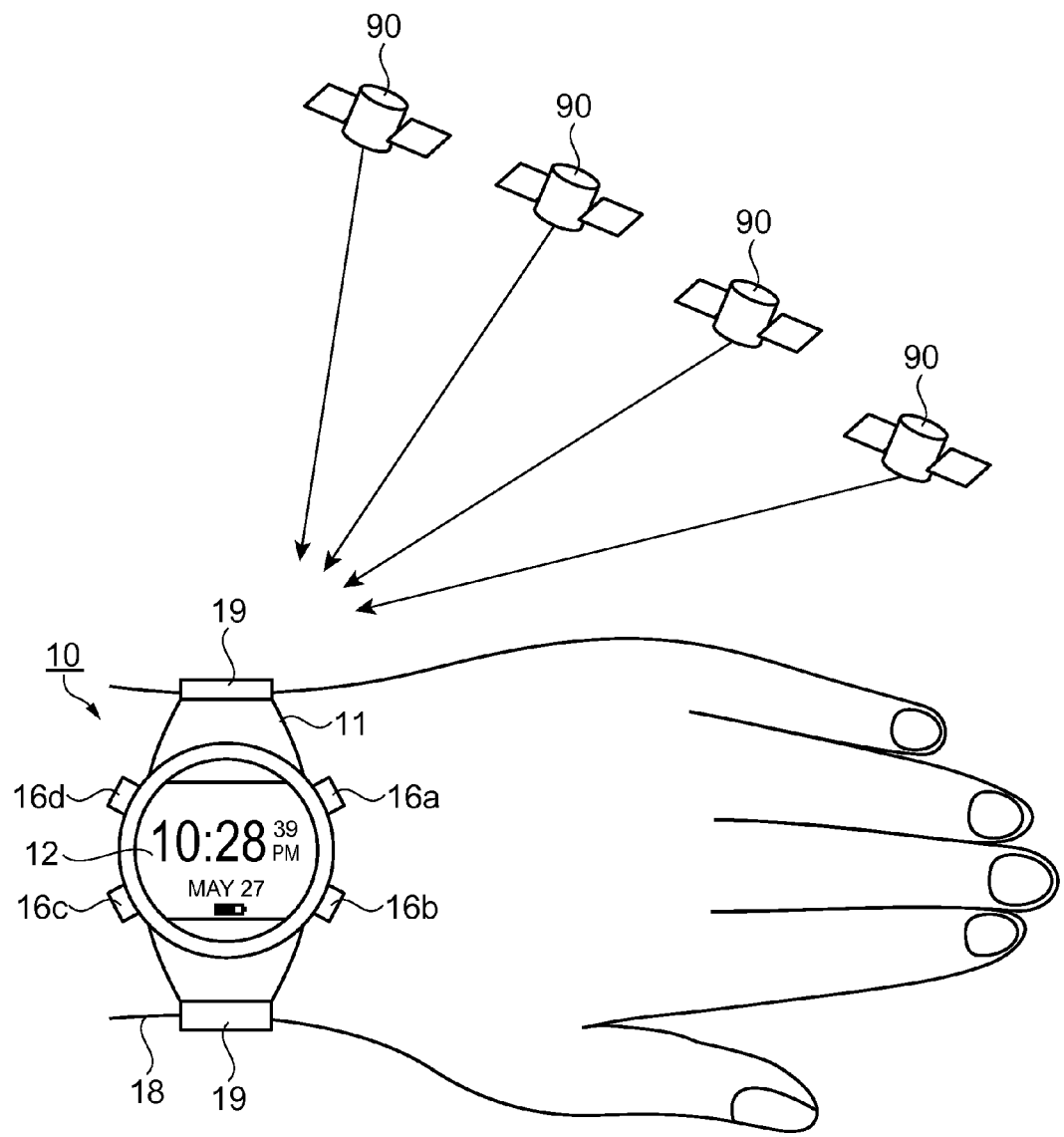
FIG. 1 is a schematic view illustrating an outline of a GPS system.

FIG. 1 is a schematic view illustrating an outline of a GPS system. As illustrated in FIG. 1, a GPS satellite 90, which is a positioning satellite, is a positional information satellite that orbits on a predetermined orbit above the Earth, and transmits a satellite signal which superposes a navigation message or the like at a microwave of 1.57542 GHz, for example, to the ground. The GPS satellite 90 has an atomic timepiece mounted thereon, and includes GPS time information which is extremely accurate time information that is timed by the atomic timepiece in the satellite signal. For this reason, the running watch 10 which is provided with a function as a GPS receiver can receive the satellite signal and display an accurate time by correcting a progress or a delay of an internal time.

In addition, the satellite signal includes orbital information which shows a position on the orbit of the GPS satellite 90. In other words, the running watch 10 can perform a positioning computation. In general, by receiving the satellite signal transmitted from each of four or more GPS satellites 90, the running watch includes a function that performs the positioning computation by using the orbital information and the GPS time information which are included in the received satellite signal. By performing the positioning computation, the running watch 10 can easily correct the time by matching a current position, or the like. Besides, if the satellite signal is used, various applications, such as displaying a current position, taking a measurement of a movement distance, or taking a measurement of a movement speed, are possible. In the running watch 10, the information can be displayed in a digital manner by a liquid crystal panel 12.

In the embodiment, the running watch 10 includes an exterior case 11 and a belt 19 for installing the exterior case 11 to an arm 18. On a side surface of the exterior case 11, operation buttons 16 (16a, 16b, 16c, and 16d) are provided. The operation buttons 16 function as an indication portion, and are assigned to be able to indicate a selection of a measurement mode, an initiation of the measurement, a temporary stop of the measurement, a completion of the measurement, setting the display of the liquid crystal panel 12, or the like, as the user pushes the operation button.

Figure 2:
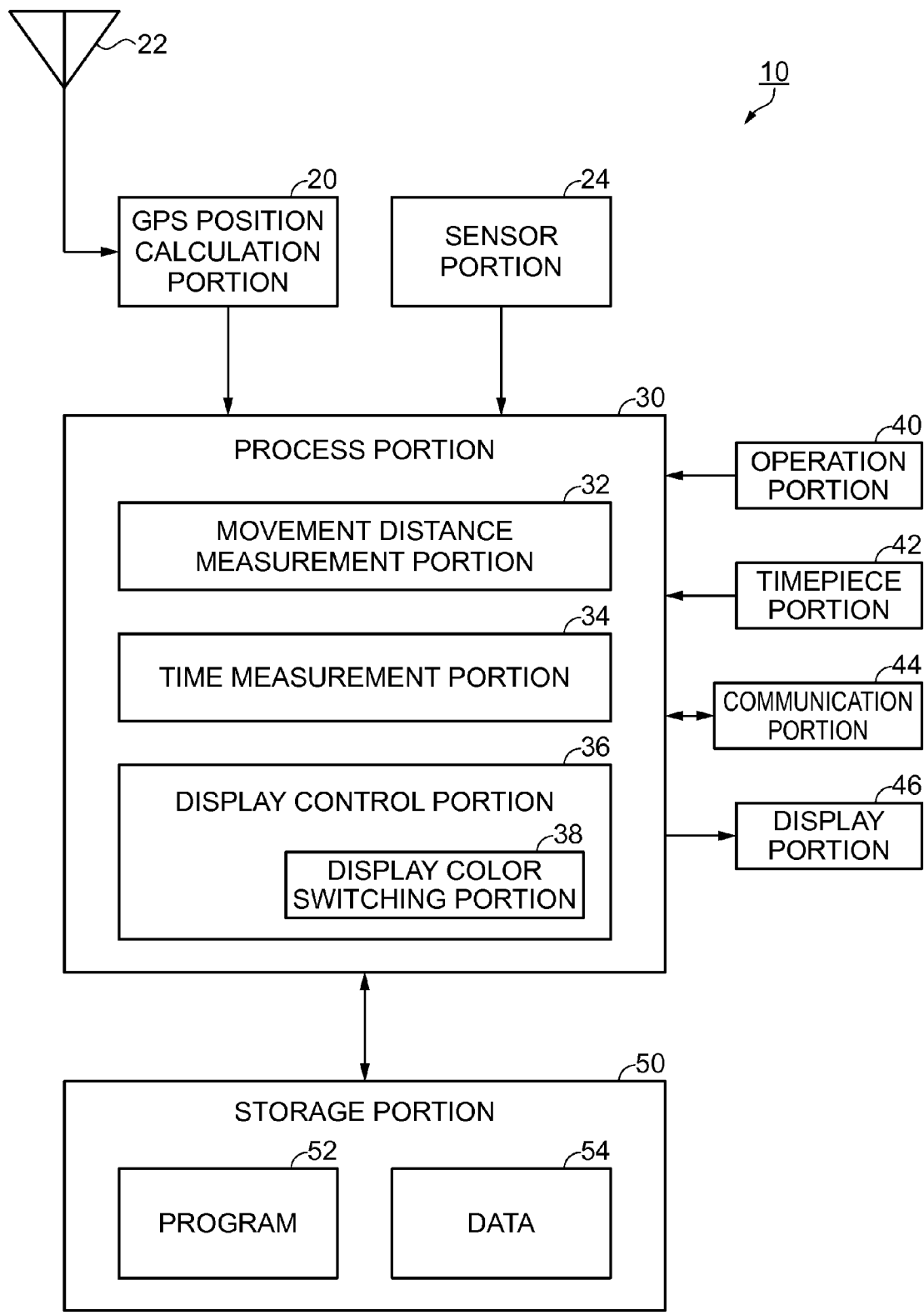
FIG. 2 is a block diagram illustrating a functional configuration of a running watch according to an embodiment of the invention.

FIG. 2 is a block diagram illustrating an example of a functional configuration of the running watch 10. The running watch 10 includes a GPS antenna 22, a GPS position calculation portion 20, a sensor portion 24, a process portion 30, an operation portion 40, a timepiece portion 42, a communication portion 44, a display portion 46, and a storage portion 50.

The GPS position calculation portion 20 is a module which uses the satellite signal transmitted from the GPS satellite 90 and measures a position or a movement speed vector.

After obtaining the orbital information of an almanac (astronomical calendar) or an ephemeris (broadcast ephemeris) from a navigation message or the like transmitted from the GPS satellite 90, and obtaining an approximate position of the GPS satellite 90 based on the obtained almanac, the GPS position calculation portion 20 obtains a specific position of the GPS satellite 90 based on the ephemeris. Furthermore, the GPS position calculation portion 20 determines four GPS satellites 90 which are the targets to be received based on the obtained positional information, receives radio frequency (RF) signals transmitted from each of the determined GPS satellites 90 by the GPS antenna 22, and obtains the satellite signal by processing and decoding the received RF signals.

The GPS position calculation portion 20 extracts measurement information which is necessary for analyzing the satellite signal. The measurement information includes an amount that is referred to as a code phase or a Doppler frequency that captures the satellite signal, or an amount that is referred to as a pseudo range or a pseudo range rate between the running watch 10 and the GPS satellite 90. By using the measurement information, the GPS position calculation portion 20 performs computation of a known position and computation of the movement speed vector, and calculates the positional information of the device itself. Furthermore, the GPS position calculation portion 20 corresponds to the position calculation portion.

The sensor portion 24 functions as the acceleration detection portion which detects acceleration, and is a sensor unit which is configured to have an inertial sensor that is an acceleration sensor or a gyro sensor, for example.

The operation portion 40 is an input apparatus which is configured to have an operation button 16 or the like, and outputs the signal showing that the buttons are pushed to the process portion 30.

The timepiece portion 42 is a timepiece inside the running watch 10, and is configured to have a crystal oscillator or the like which is a quartz crystal resonator and an oscillation circuit. The time information of the timepiece portion 42 is output to the process portion 30 at any time.

The communication portion 44 is a communication apparatus for transmitting and receiving the information used in the apparatus between the outside information processing apparatuses according to control of the process portion 30. Examples of the communication technique of the communication portion 44 can include various methods, such as a wire connection method via a cable in conformity to a predetermined communication standard, a connection method via an intermediate apparatus which also serves as a charger referred to as a cradle, or a wireless connection method by using near-field wireless communication.

The display portion 46 is a display apparatus which is configured to have a liquid crystal display (LCD) as a liquid crystal panel 12, and displays various types of information based on the display signal output from the process portion 30.

The process portion 30 is a processor which generally controls each functional portion of the running watch 10 according to a program 52 stored in the storage portion 50, and is configured to have a processor, such as a central processing unit (CPU) or a digital signal processor (DSP).

In the embodiment, the process portion 30 includes a movement distance measurement portion 32, a time measurement portion 34, and a display control portion 36, as main functional portions. Here, the movement distance measurement portion 32 and the time measurement portion 34 correspond to the measurement portion.

The movement distance measurement portion 32 measures the movement distance or the movement speed which considers a reference position where the measurement is initiated as the starting point, based on the positional information of the device itself calculated by the GPS position calculation portion 20. Furthermore, when the GPS position calculation portion 20 cannot calculate the positional information of the device itself, an aspect can be assumed in which the movement distance measurement portion 32 calculates the movement amount based on an output signal of the inertial sensor of the sensor portion 24, and derives the movement distance or the like based on the calculated movement amount.

The time measurement portion 34 measures the lapse of time or the like, based on the time information output from the timepiece portion 42.

Furthermore, the process portion 30 can calculate a pace, lap time, split time, a movement locus, and consumed calories, based on information which is related to a distance measured by the movement distance measurement portion 32 and information which is related to time measured by the time measurement portion 34.

The display control portion 36 generates a display screen which shows a measurement result measured by the movement distance measurement portion 32 or the time measurement portion 34, a calculation result calculated by the process portion 30, and a searching state of the GPS satellite 90 by the GPS position calculation portion 20, and performs a control to display the generated display screen on the display portion 46.

In the embodiment, according to a process circumstance of the process portion 30, the display control portion 36 transits to any one of a satellite search display mode which displays a display screen (search screen) showing a searching state of the GPS satellite 90, a time display mode which displays a display screen (home screen) displaying current time, and the measurement mode which measures or calculates the movement information, such as traveling time or traveling distance of the user, and displays a display screen (chronograph screen) showing the calculation result.

The measurement mode can display plural information, such as the movement distance or temporal information measured by the movement distance measurement portion 32, the time measurement portion 34, and the process portion 30 on one chronograph screen, for example, display only the information of the movement distance on the chronograph screen, based on a selection operation of the user.

The display control portion 36 has a display color switching portion 38. While the measurement mode is performed, when a state transits from the measurement state to the non-measurement state or from the non-measurement state to the measurement state, according to the indication from the operation portion 40 or the process portion 30, by switching the display color of the displayed chronograph screen to a color corresponding to the transited state, the display color switching portion 38 has a function that visually shows a current transition state to the user. Furthermore, the non-measurement state can be assumed as a reset state which initializes a measurement value, or as a temporary stop (pause) state which can continue the measurement.

For example, when the user pushes the operation button 16 set to initiate the measurement, the movement distance measurement portion 32 and the time measurement portion 34 initiate the measurement corresponding to the operation button 16, and the display control portion 36 displays the character area of the chronograph screen displayed in the display color (first color) which shows the measurement state, on the display portion 46. In addition, when the user pushes the operation button 16 set to stop the measurement, the movement distance measurement portion 32 and the time measurement portion 34 stop the measurement, and the display control portion 36 displays the character area of the chronograph screen displayed in the display color (second color) which shows the non-measurement state, on the display portion 46.

Furthermore, the transition from the measurement state to the non-measurement state is not limited to the button operation. For example, when the movement distance measurement portion 32 and the time measurement portion 34 are in the middle of the measurement, and a predetermined condition, for example, the movement speed is a predetermined value or lower, the process portion 30 functions as the indication portion and indicates the stop of the measurement to the movement distance measurement portion 32 or the time measurement portion 34. Furthermore, when the measurement is stopped under this condition, the measurement is resumed if the movement speed exceeds the predetermined value.

In the embodiment, when the display portion 46 displays the display screen in white and black, and the display color switching portion 38 performs the measurement mode, a white color and a black color are replaced and inverted according to the measurement state or the non-measurement state. In other words, in a case of the measurement state, the character area which shows the information on the chronograph screen is displayed in black, and the background area is displayed in white (refer to FIG. 4D). In addition, in a case of the non-measurement state, the character area on the chronograph screen is displayed in white, and the background area is displayed in black (refer to FIG. 4E). Furthermore, as the user performs the setting, it is possible to reverse the display pattern of the measurement state and the non-measurement state. In addition, by characteristics of the liquid crystal panel 12, an aspect can be assumed in which the display pattern is determined, in consideration of reducing a power consumption by reducing the area in black.

Furthermore, the embodiment is not limited to the inversion display of the display color. For example, an aspect can also be assumed in which color information corresponding to the state of the measurement is set in advance, and the display color of the character area or the display color of the background area corresponding to the measurement state and the non-measurement state is switched. In addition, the state which can be transited is not limited to the measurement state and the non-measurement state, and the transition among three or more other states can be assumed.

In addition, the display color of the entire area displayed by the liquid crystal panel 12 may be switched, and the display color only in a part of the area which displays predetermined information may be switched. In addition, when the display color is switched, an aspect can also be assumed in which a switching of the display color of the chronograph screen is notified to the user, by flashing the chronograph screen, or by repeatedly switching a current display color and a display color to be switched over at predetermined times.

The storage portion 50 is configured to have a storage apparatus, such as a read only memory (ROM), a flash ROM, or a random access memory (RAM), and stores a program 52 for controlling the running watch 10 by the process portion 30 or data 54 for performing various application processes.

Figure 3:
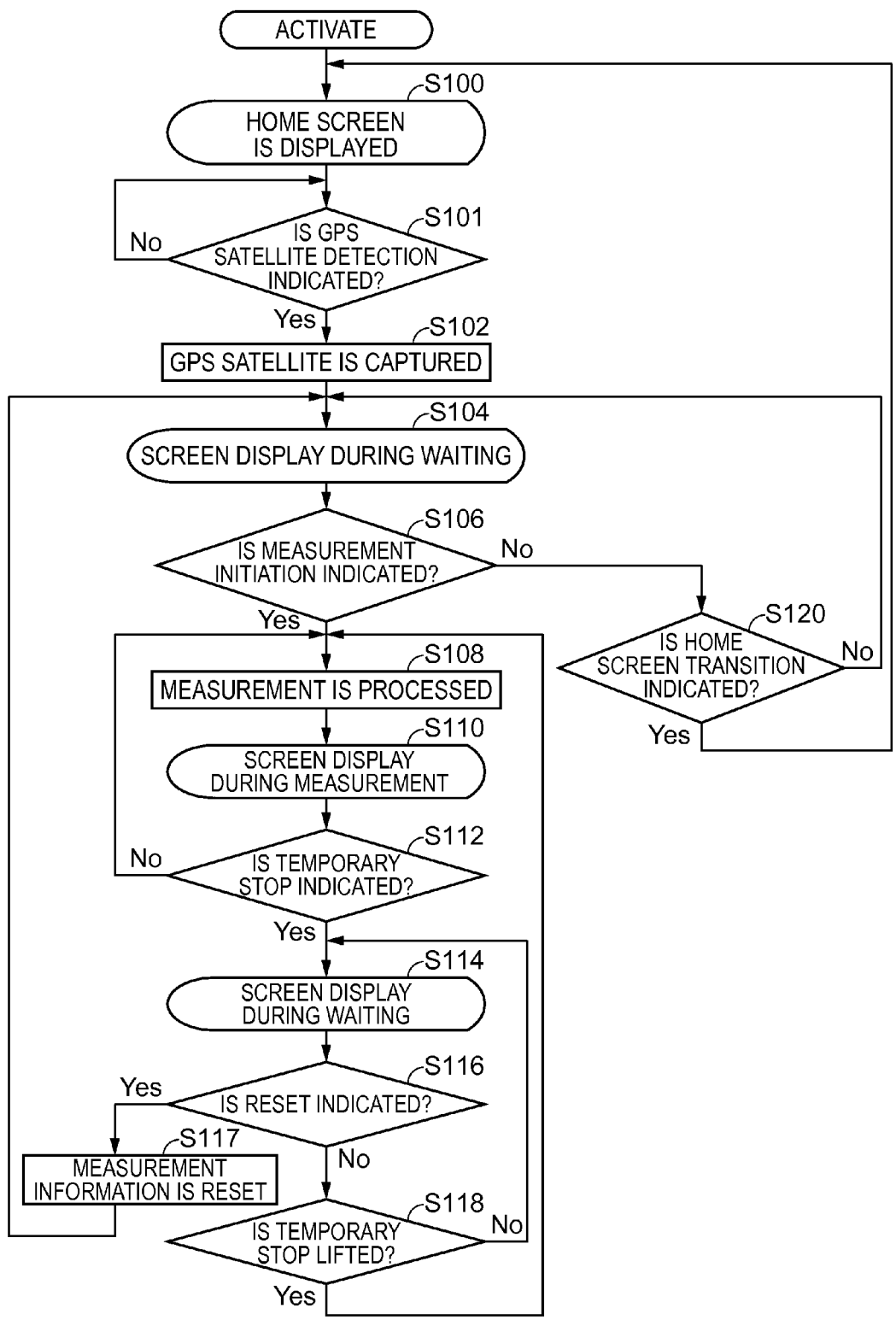
FIG. 3 is a flow chart illustrating a flow of a process in the running watch according to the embodiment of the invention.

FIG. 3 is a flow chart illustrating a flow of a process in the running watch 10, and describes with appropriate reference to a view illustrating the transition of the display screen in FIGS. 4A to 4E. Furthermore, in the following description, the display control portion 36 is described to be limited to an aspect in which only the movement distance is displayed on the chronograph screen.

Figure 4A:
FIGS. 4A to 4E are views illustrating transition of display screens.

When the running watch 10 is activated, the process portion 30 transits to a waiting state which is a home position. At the same time, the display control portion 36 transits to a time display mode, and displays the current time on the display portion 46 as a home screen, as illustrated in FIG. 4A (Step S100).

Next, the process portion 30 determines whether or not the GPS satellite searching is indicated (Step S101), and repeats the determination of Step S101 when the GPS satellite searching is not indicated by the user (NO in Step S101).

Figure 4B:
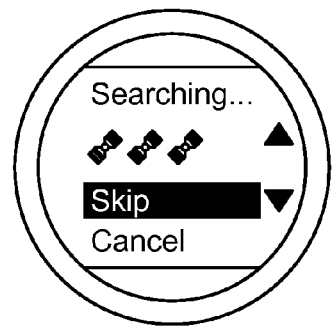

In the embodiment, if a predetermined operation button 16 is pushed when the home screen is displayed, a selection screen (not illustrated) is displayed, and the GPS satellite searching is indicated to be performed when the user selects a chronograph function from the selection screen. In this manner, when the GPS satellite searching is indicated (YES in Step S101), the process portion 30 captures the plurality of GPS satellites 90 and receives the satellite signal (Step S102), and calculates the positional information based on the received satellite signal. In this case, the display control portion 36 transits to a satellite searching display mode, and displays the search screen which shows the searching state as illustrated in FIG. 4B, on the display portion 46.

Figure 4C:

Next, the process portion 30 transits the measurement indication from the user to the waiting state. At the same time, the display control portion 36 transits to the measurement mode, and displays the chronograph screen in the display color which shows the non-measurement state, as illustrated in FIG. 4C, on the display portion 46 (Step S104). In this case, the movement distance measured by the movement distance measurement portion 32 is initialized, and the movement distance displayed on the display portion 46 is displayed as an initial value.

Next, the process portion 30 determines whether or not the measurement initiation is indicated from the user (Step S106). Here, when the measurement initiation is not indicated from the user (NO in Step S106), the process portion 30 determines whether or not the transition to the home screen is indicated from the user (Step S120). When the transition to the home screen is indicated (YES in Step S120), the process goes back to Step S100. Meanwhile, when the transition to the home screen is not indicated (NO in Step S120), the process goes back to Step S104.

In addition, when the measurement initiation is indicated from the user (YES in Step S106), the process portion 30 initiates the measurement process (Step S108), and initiates the measurement of the lapse of time and the movement distance.

Figure 4D:

Furthermore, as illustrated in FIG. 4D, the display control portion 36 displays the chronograph screen in the display color which shows the measurement state, on the display portion 46 (Step S110).

Next, the process portion 30 determines whether or not the temporary stop of the measurement is indicted from the user (Step S112). Here, when the temporary stop of the measurement is not indicted from the user (NO in Step S112), the process goes back to Step S108 and continues the measurement process at a predetermined time interval.

Figure 4E:

Meanwhile, when the temporary stop of the measurement is indicted from the user (YES in Step S112), the display control portion 36 displays the chronograph screen in the display color which shows the non-measurement state, on the display portion 46, as illustrated in FIG. 4E (Step S114). In this case, the movement distance measured by the movement distance measurement portion 32 is maintained, and the movement distance measured by this process is displayed on the display portion 46.

Next, the process portion 30 determines whether or not a reset of the measurement is indicated from the user (Step S116). Here, when the reset of the measurement is indicated from the user (YES in Step S116), the measurement information, such as the movement distance, is reset (Step S117), and the process goes back to Step S104.

Meanwhile, when the reset of the measurement is not indicated from the user (NO in Step S116), the process portion 30 determines whether or not the temporary stop is indicated to be lifted from the user (Step S118). Here, when the temporary stop is not indicated to be lifted from the user (NO in Step S118), the process goes back to Step S114.

Meanwhile, when the temporary stop is indicated to be lifted from the user (YES in Step S118), the process goes back to Step S108 and continues the measurement process at the predetermined time interval. In this case, the movement distance measured by the movement distance measurement portion 32 is added to the movement distance displayed on the display portion 46 and counted, and the counted movement distance is displayed on the display portion 46.

Furthermore, in the embodiment, the above processes are performed continuously. When a system reset of the running watch 10 is indicated, after the process portion 30 performs an initialization process, the process from the Step S100 is performed.

According to the above-described embodiment, the following is effective.

(1) Since the running watch 10 changes and displays the display color on the display portion 46 corresponding to a case where the set measurement items are in the middle of the measurement, and to a case where the set measurement items are stopped, the user can easily confirm the measurement state visually by the display color. Therefore, when the measurement is temporarily stopped in accordance with the temporarily stopped traveling, the user can easily confirm whether or not the measurement is resumed when the traveling is resumed.

(2) As the character area is displayed in black and the background area is displayed in white during the measurement, it is possible to improve visibility of display information while traveling.

There is a case where the apparatus which performs the above method is realized by a single apparatus, and there is a case where the apparatus is realized by combining a plurality of apparatuses. The apparatus includes various aspects.

Each configuration and the combination thereof in each embodiment is an example. The configuration can be added, omitted, changed, and modified without departing from the scope of the invention. In addition, the embodiment of the invention is not limited, and limited only to the scope of the appended claims.

The entire disclosure of Japanese Patent Application No. 2013-181106, filed Sep. 2, 2013 is expressly incorporated by reference herein.

What is claimed is:

1. An electronic device, comprising:
   a measurement portion which measures a lapse of time when a measurement initiation is indicated from a user;
   a display portion which displays a measurement result measured by the measurement portion on a display screen;
   a display control portion which switches to one or more display colors of the display screen corresponding to one or more measurement states of the measurement portion, wherein the one or more measurement states comprise at least a measurement state and a non-measurement state; and
   a position calculation portion which calculates positional information based on a signal from a positioning satellite,
   wherein the measurement portion measures movement information based on the lapse of time and the positional information.

2. The electronic device according to claim 1, further comprising:
   an indication portion which indicates an initiation or a stop of the measurement,
   wherein the measurement portion transits to the measurement state or the non-measurement state according to the indication of the indication portion, and
   wherein the display control portion switches the display color to a first color when the measurement portion is in the measurement state, and switches the display color to a second color when the measurement portion is in the non-measurement state.

3. The electronic device according to claim 2,
   wherein the indication portion indicates the stop of the measurement when the measurement portion is in the measurement state and a predetermined condition is established.

4. The electronic device according to claim 1,
   wherein, the display control portion switches the display color of at least a part of an area of the display screen corresponding to the state of the measurement portion.

5. The electronic device according to claim 1,
   wherein, the display screen includes a character area and a background area, and the display control portion switches at least one display color of the character area and the background area.

6. The electronic device according to claim 1,
   wherein the display screen is displayed in white and in black, and the display control portion switches the white color and the black color to each other.

7. The electronic device according to claim 1,
   wherein the movement information is a movement distance which considers a position where the measurement is initiated as a starting point, and
   wherein the display portion displays the movement distance.

8. The electronic device according to claim 1, further comprising:
   an acceleration detection portion which detects acceleration and calculates a movement amount based on the detected acceleration,
   wherein the measurement portion calculates the movement distance based on the movement amount calculated by the acceleration detection portion when the position calculation portion cannot calculate the positional information.

* * * * *